(12) United States Patent
Knapik et al.

(10) Patent No.: US 11,838,192 B2
(45) Date of Patent: Dec. 5, 2023

(54) APPARATUS AND METHOD FOR MONITORING NETWORK

(71) Applicant: Samsung Electronics Co., Ltd., Suwon-si (KR)

(72) Inventors: Bartlomiej Knapik, Warsaw (PL); Jaroslaw Karciarz, Warsaw (PL); Pawel Daniluk, Warsaw (PL); Soonyoung Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 17/310,554

(22) PCT Filed: Jul. 29, 2021

(86) PCT No.: PCT/KR2021/009899
§ 371 (c)(1),
(2) Date: Aug. 10, 2021

(87) PCT Pub. No.: WO2022/035102
PCT Pub. Date: Feb. 17, 2022

(65) Prior Publication Data
US 2022/0217062 A1    Jul. 7, 2022

(30) Foreign Application Priority Data
Aug. 10, 2020 (KR) .......... 10-2020-0100125

(51) Int. Cl.
*H04L 43/04* (2022.01)
*H04L 43/06* (2022.01)
*H04L 41/16* (2022.01)

(52) U.S. Cl.
CPC .............. *H04L 43/06* (2013.01); *H04L 41/16* (2013.01); *H04L 43/04* (2013.01)

(58) Field of Classification Search
CPC .......... H04L 43/04; H04L 43/06; H04L 41/16
See application file for complete search history.

(56) References Cited

U.S. PATENT DOCUMENTS

| 9,171,158 B2 | 10/2015 | Akoglu et al. |
| 9,306,966 B2 | 4/2016 | Eskin et al. |
| (Continued) | | |

FOREIGN PATENT DOCUMENTS

| KR | 10-1888683 B1 | 8/2018 |
| KR | 10-2019-0046018 A | 5/2019 |
| (Continued) | | |

OTHER PUBLICATIONS

An, et al., "Variational Autoencoder based Anomaly Detection using Reconstruction Probability", SNU Data Mining Center, 2015-2 Special Lecture on IE, Dec. 27, 2015, 18 pages.
(Continued)

*Primary Examiner* — Shirley X Zhang

(57) ABSTRACT

A network monitoring apparatus includes a memory configured to store a performance management data sample of a network; and at least one processor configured to input the performance management data sample and an abnormality probability value to an auto-encoder of an abnormality detection model that is trained based on performance management data of the network, wherein the abnormality probability value is a default value, obtain, from the auto-encoder of the abnormality detection model, a reconstructed performance management data sample and an abnormality score value, and detect an abnormal sample based on the abnormality score value, wherein the auto-encoder is configured to receive the performance management data sample and the abnormality probability value, and output the reconstructed performance management data sample and the abnormality score value.

14 Claims, 9 Drawing Sheets

(56) References Cited

U.S. PATENT DOCUMENTS

| | | |
|---|---|---|
| 10,061,677 B2 | 8/2018 | Toledano |
| 10,432,653 B2 | 10/2019 | Sim et al. |
| 2007/0289013 A1 | 12/2007 | Lim |
| 2008/0229153 A1 | 9/2008 | Li et al. |
| 2015/0269050 A1 | 9/2015 | Filimonov et al. |
| 2016/0147583 A1 | 5/2016 | Ben Simhon et al. |
| 2017/0284896 A1 | 10/2017 | Harpale et al. |
| 2018/0096261 A1 | 4/2018 | Chu et al. |
| 2018/0247200 A1 | 8/2018 | Rolfe |
| 2018/0293516 A1 | 10/2018 | Lavid Ben Lulu et al. |
| 2018/0365089 A1* | 12/2018 | Okanohara .......... G06N 3/0454 |
| 2020/0320402 A1* | 10/2020 | Yoon ...................... G06N 3/088 |
| 2020/0380570 A1* | 12/2020 | Ramakrishnan .... G06F 18/2148 |

FOREIGN PATENT DOCUMENTS

| | | |
|---|---|---|
| KR | 10-2032518 B1 | 10/2019 |
| KR | 10-2055915 B1 | 12/2019 |
| WO | 2014183782 A1 | 11/2014 |

OTHER PUBLICATIONS

Wu, et al., "CellPAD: Detecting Performance Anomalies in Cellular Networks via Regression Analysis", Proceedings of IFIP Networking, Zurich, Switzerland, May 2018, 9 pages.

Casas, et al., "Machine-Learning Based Approaches for Anomaly Detection and Classification in Cellular Networks", Published in TMA 2016, Computer Science, Apr. 2016, 8 pages.

Chen, et al., "Outlier Detection with Autoencoder Ensembles" Proceedings of the 2017 SIAM International Conference on Data Mining (SDM), Published: 2017, 9 pages.

Kieu, et al., "Outlier Detection for Time Series with Recurrent Autoencoder Ensembles", Proceedings of the Twenty-Eighth International Joint Conference on Artificial Intelligence (IJCAI-19), Aug. 2019, 8 pages.

International Search Report and Written Opinion of the International Searching Authority dated Oct. 27, 2021, in connection with International Application No. PCT/KR2021/009899, 16 pages.

* cited by examiner

FIG. 9

| Precision | TPR | FPR | F1 | TP | TN | FP | FN |
|---|---|---|---|---|---|---|---|
| 0.9141 | 0.8952 | 0.0014 | 0.9045 | 1682 | 110159 | 158 | 197 |

APPARATUS AND METHOD FOR MONITORING NETWORK

CROSS-REFERENCE TO RELATED APPLICATIONS

This application is a 371 of International Application No. PCT/KR2021/009899, filed Jul. 29, 2021, which claims priority to Korean Patent Application No. 10-2020-0100125, filed Aug. 10, 2020, the disclosures of which are herein incorporated by reference in their entirety.

BACKGROUND

1. Field

The disclosure relates to a network monitoring apparatus, a control method of the network monitoring apparatus, and a computer-readable storage medium storing a computer program for executing the control method of the network monitoring apparatus.

2. Description of Related Art

There is a need to use a machine learning model to detect abnormalities in network performance data. Various methods of detecting abnormalities using the machine learning model include a method using a density of a sample within a space, a method using a distance from an average value, a method using a trend, etc. A density-based method in the machine learning model uses a method of clustering or grouping normal data and other data. The clustering method determines that the sample is normal when the sample belongs to the largest cluster, and determines that the sample is abnormal when the sample belongs to one of small clusters or does not belong to the largest cluster. The method using the distance from the average value uses a score value, or determines that only data closest to the average is normal. The method using the trend learns a normal behavioral profile and represents a difference between a predicted measurement sample and a next measurement sample as an abnormality score. A trend learning method determines a sample as a normal value when a predicted value and a measured value are similar, and determines the sample as an abnormal value when a difference between the measured value and the predicted value exceeds a threshold value.

However, these existing methods have various problems. A method using a distance definition has a problem that affects cluster analysis. In a trend prediction method, there are problems in that a threshold value depends on an abnormal type in trend prediction, and an implicit assumption is required that training of a normal behavior is performed only on normal data, and an intervention of a domain expert is required. In addition, in the existing methods, a model tends to overfit when a model is trained based on mixed data of normal and abnormality data, and there is a problem of labeling abnormal samples as normal samples in a training data set, and thus balancing is required between known and unknown samples (e.g., rare and novel samples). In addition, because a feature distribution which commonly occurs in $4^{th}$-generation/$5^{th}$-generation (4G/5G) performance data greatly deviates from the Gaussian distribution (for example, it is very distorted), there are limitations in detecting abnormal samples by using the existing methods. Most of the methods work best with features having the Gaussian distribution, and there is not a scheme to directly address these limitations.

SUMMARY

Embodiments of the disclosure are provided for detection of an abnormal sample in network performance data by using a machine learning model. Embodiments of the disclosure provide an apparatus and method for training a model by unsupervised learning and using the trained model without prior classification of abnormal types.

Also, embodiments of the disclosure provide an apparatus and method for generating and using a machine learning model by using all sample data as training data without prior definition of a normal data period of network performance data.

According to an embodiment of the disclosure, a network monitoring apparatus includes memory configured to store a performance management data sample of a network; and at least one processor configured to input the performance management data sample and an abnormality probability value to an auto-encoder of an abnormality detection model that is trained based on performance management data of the network, wherein the abnormality probability value is a default value, obtain, from the auto-encoder of the abnormality detection model, a reconstructed performance management data sample and an abnormality score value, and detect an abnormal sample based on the abnormality score value, wherein the auto-encoder is configured to receive the performance management data sample and the abnormality probability value, and output the reconstructed performance management data sample and the abnormality score value.

The at least one processor may determine the performance management data sample as an abnormal sample based on the abnormality score value exceeding a reference value.

The at least one processor may train the abnormality detection model by updating the auto-encoder to minimize a loss function of the auto-encoder after an amount of time periods have passed.

The at least one processor may perform one loop of training of the auto-encoder by using auto-encoder training data including an initial value of the abnormality probability value and a first number of performance management samples, perform training of the abnormality detection model, and in a training process, update the abnormality probability value output from the auto-encoder after a amount of time periods have passed.

The auto-encoder may include an encoder and a decoder The encoder may generate a latent variable from the performance management data sample and the abnormality probability value. The decoder may generate a reconstructed performance management data sample and an abnormality score value from the latent variable.

The at least one processor may train the encoder to minimize a Kullback-Leibler (KL) divergence loss value.

The at least one processor may train the decoder to minimize a loss value determined by a difference between the performance management data sample and the reconstructed performance management data sample, a standard deviation of the reconstructed performance management data sample, and a cross entropy value between the abnormality probability value and the abnormality score.

The at least one processor may input initial value training data including normal and abnormal periods of the performance management data sample to the auto-encoder, obtain the reconstructed performance management data sample and an initial standard deviation value with respect to the reconstructed performance management data sample from the auto-encoder, and determine the initial abnormality probability value based on the initial standard deviation value.

The initial abnormality probability value may indicate a ratio of reconstructed performance management data samples belonging to an abnormal range in a normal distribution of the reconstructed performance management data sample determined based on the initial standard deviation value.

Each of the encoder and the decoder may include at least two hidden layers that are fully connected.

The auto-encoder may include a variational auto-encoder (VAE).

The default value of the abnormality rate value may be a value indicating that a probability of detecting an abnormal sample is 0.

According to another embodiment of the disclosure, a control method of a network monitoring apparatus includes storing a performance management data sample of a network; inputting the performance management data sample and an abnormality probability value to an auto encoder of an abnormality detection model that is trained based on performance management data of the network, wherein the abnormality probability value is a default value; obtaining, from the auto-encoder of the abnormality detection model, a reconstructed performance management data sample and an abnormality score value; and detecting an abnormal sample based on the abnormality score value, wherein the auto-encoder is configured to receive the performance management data sample and the abnormality probability value, and output the reconstructed performance management data sample and the abnormality score value.

According to another embodiment of the disclosure, a computer-readable storage medium stores a computer program for executing a control method of a network monitoring apparatus, when executed by a processor, wherein the control method includes: storing a performance management data sample of a network; inputting the performance management data sample and an abnormality probability value to an auto encoder of an abnormality detection model that is trained based on performance management data of the network, wherein the abnormality probability value is a default value; obtaining, from the auto-encoder of the abnormality detection model, a reconstructed performance management data sample and an abnormality score value; and detecting an abnormal sample based on the abnormality score value, wherein the auto-encoder is configured to receive the performance management data sample and the abnormality probability value, and output the reconstructed performance management data sample and the abnormality score value.

According to embodiments of the disclosure, an abnormal sample may be detected in network performance data by using a machine learning model. According to embodiments of the disclosure, an apparatus and method for training a model by unsupervised learning and using the trained model without prior classification of abnormal types may be provided.

According to embodiments of the disclosure, an apparatus and method for generating and using a machine learning model by using all sample data as training data without prior definition of a normal data period of network performance data may be provided.

BRIEF DESCRIPTION OF DRAWINGS

FIG. 9 is a diagram illustrating performance test results according to an embodiment of the disclosure.

DETAILED DESCRIPTION

Figure 1:
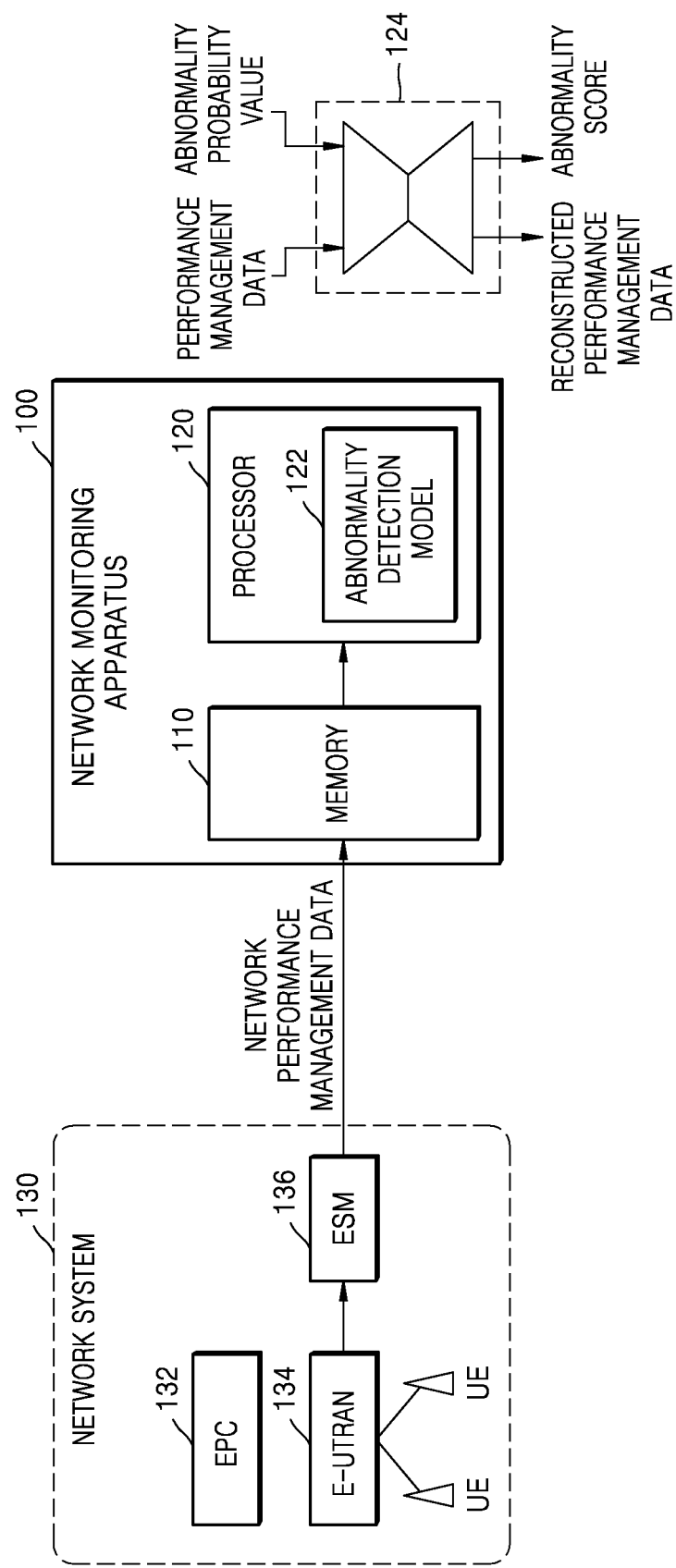
FIG. 1 is a diagram illustrating a network monitoring apparatus and a network system, according to an embodiment of the disclosure.

Throughout the disclosure, the expression "at least one of a, b or c" indicates only a, only b, only c, both a and b, both a and c, both b and c, all of a, b, and c, or variations thereof.

The present specification describes and discloses the principle of embodiments of the disclosure to clarify the scope of the disclosure and to allow those of ordinary skill in the art to carry out the embodiments of the disclosure. The embodiments of the disclosure may be implemented in various forms.

Throughout the specification, an identical reference numeral will indicate an identical element. The present specification does not describe all elements of embodiments of the disclosure, and general information in the technical field of the disclosure or repeated information over the embodiments of the disclosure will be omitted. A "module" or "unit" used herein may be implemented with software, hardware, or firmware, and depending on embodiments of the disclosure, a plurality of "modules" or "units" may be implemented with one unit or element or one "module" or "unit" may include a plurality of elements.

In a description of embodiments of the disclosure, a detailed description of related well-known techniques will be omitted when it unnecessarily obscures the subject matter of the disclosure. In addition, numbers (e.g., first, second, etc.) used in the description of the specification are merely identification symbols for distinguishing one element from another element.

Moreover, in the present specification, when a component is mentioned as being "connected" or "coupled" to another component, it may be directly connected or directly coupled to the another component, but unless described otherwise, it should be understood that the component may also be connected or coupled to the another component via still another component therebetween.

Hereinafter, the operating principle and various embodiments of the disclosure will be described in detail with reference to the accompanying drawings.

FIG. 1 is a diagram illustrating a network monitoring apparatus 100 and a network system 130 according to an embodiment of the disclosure.

The network monitoring apparatus 100 according to an embodiment of the disclosure receives network performance data (PM data) from the network system 130 and detects an abnormal operation of the network system 130. The network monitoring apparatus 100 may be mounted on a certain device such as a base station, a gateway, or a server in the network system 130 or may remotely receive the network performance data to detect the abnormal operation of the network system 130.

In the disclosure, for convenience of description, a $3^{rd}$ Generation Partnership Project Long Term Evolution (3GPP LTE) system will be described as an example. However, embodiments of the disclosure are not limited to terms and names used, and may be applied to network systems or wireless communication systems according to other standards. For example, embodiments of the disclosure may be applied to 3GPP new radio (NR) ($5^{th}$ generation mobile communication standard). In addition, embodiments of the disclosure may be applied to intelligent services (e.g., smart home, smart building, smart city, smart car or connected car, healthcare, digital education, retail, security and safety-related services, etc.) based on 5G communication technology and IoT-related technology.

Wireless communication systems have been developed from wireless communication systems providing voice-centered services in the early stage toward broadband wireless communication systems that provide high-speed and high-quality packet data services such as a communication standard, for example, High Speed Packet Access (HSPA) of 3GPP, LTE or Evolved Universal Terrestrial Radio Access (E-UTRA), LTE-Advanced (LTE-A), LTE-Pro, High Rate Packet Data (HRPD) of 3GPP2, Ultra Mobile Broadband (UMB), and 802.16e of IEEE.

As a representative example of the broadband wireless communication system, the LTE system employs an Orthogonal Frequency Division Multiplexing (OFDM) scheme for downlink (DL) and employs a Single Carrier Frequency Division Multiplexing (SC-FDMA) scheme for uplink (UL). The UL refers to a wireless link through which a terminal (user equipment (UE) or mobile station (MS) transmits data or control signals to a base station (eNode B or base station (BS), and the DL refers to a wireless link through which the base station transmits data or control signals to the terminal. The multiple access method as described above identifies data or control information of each user by assigning and operating time-frequency resources to carry the data or the control information for each user so that the time-frequency resources do not overlap with each other, that is, orthogonality is established.

As a future communication system after LTE, that is, a 5G communication system, needs to be able to freely reflect various requirements of users and service providers, and thus services that simultaneously satisfy various requirements need to be supported. Services considered for the 5G communication system include Enhanced Mobile Broad-Band (eMBB), massive Machine Type Communication (mMTC), Ultra Reliability Low Latency Communication (URLLC), or the like.

At the same time, mMTC is being considered to support application services such as Internet of Things (IoT) in the 5G communication system. A large-scale terminal access support within a cell, improved terminal coverage, improved battery time, and reduced terminal costs may be required for mMTC so as to efficiently provide the IoT. The IoT is attached to various sensors and various devices to provide communication functions, and thus the IoT needs to be able to support a large number of terminals (for example, 1,000,000 terminals/km2) within a cell. In addition, because the terminal supporting mMTC is highly likely to be located in a shadow area not covered by the cell, such as the basement of a building due to the nature of the service, a wider coverage may be required compared to other services provided by the 5G communication system.

Finally, URLLC is a cellular-based wireless communication service used for a mission-critical, and may be used for services used for a remote control of robots or machinery, industrial automation, unmanned aerial vehicle, remote health care, emergency alert, etc. Therefore, the communication provided by URLLC may have to provide very low latency (ultra low latency) and very high reliability (ultra reliability). For example, a service supporting URLLC needs to satisfy an air interface latency less than 0.5 milliseconds, and at the same time may have a requirement of a packet error rate equal to or less than $10^{-5}$. Therefore, for the service supporting URLLC, the 5G system needs to provide a smaller Transmit Time Interval (TTI) than other services, and at the same time, a design requirement to allocate wide resources in a frequency band may be required so as to secure reliability of a communication link.

As described above, as the network system 130 evolves, high reliability is required, and a method and apparatus for detecting and monitoring abnormal operations with high performance in the network system 130 are required. However, as the size and the amount of data of the network system 130 increase rapidly, it is difficult to monitor the network system 130. In particular, in the case of a method in which a person needs to directly intervene so as to monitor the network system 130, a tremendous amount of manpower and cost are consumed, which acts as a limitation to maintain the reliability of the network system 130. Embodiments of the disclosure provide an apparatus and method for collecting the performance data (PM data) output from the network system 130, machine-training an abnormality detection model 122 for detecting an abnormal operation of the network system 130 using the PM data without a prior classification, and detecting the abnormal operation of the network system 130 using the machine-trained abnormality detection model 122.

The network system 130 according to an embodiment of the disclosure includes an Evolved Packet Core (EPC) 132, an Evolved Universal Terrestrial Radio Access Network (E-UTRAN) 134, EPS Session Management (ESM) 136, and the terminal UE. The network system 130 includes the EPC 132 corresponding to a wired core network and the E-UTRAN 134 corresponding to a wireless access network. The EPC 132 and the E-UTRAN 134 constitute a mobile communication network, and such a mobile communication network is defined as an Evolved Packet System (EPS) in the LTE. The E-UTRAN 134 wirelessly communicates with the terminal UE. The ESM 136 manages a session of the EPC 132. The ESM 136 generates and outputs network performance data (KPI data) and Performance Management (PM) data including various types of KPI data. During network operation, the KPI data and the PM data are collected and output from the ESM 136. PM data samples constitute the KPI data collected and aggregated over a reporting period (e.g., 15 minutes) representing a state of a network element or cell at a given time interval. In the disclosure, a sample of the PM data is referred to as a performance management data sample. According to an embodiment of the disclosure, the abnormality detection model 122 is arranged in parallel with the stored performance management data sample and performs real-time analysis on a last data sample.

In this specification, network performance management data is used as a collective term for the PM data. A network performance management data sample means a data sample corresponding to a certain time among the network performance management data. A normal sample refers to a network performance management data sample determined to be normal, and an abnormal sample refers to a network performance management data sample determined to be abnormal.

According to an embodiment of the disclosure, the network performance management data sample constitutes a signal type and a parameter, and each of a plurality of base stations of the network system 130 allocates a state of a call as the parameter and generates results of allocation according to a signal type. Performance management data samples may be collected for each unit period such as year, month, day, and hour.

The network monitoring apparatus 100 may be implemented in the form of, for example, an embedded apparatus, a server, or an electronic apparatus in a managing system. The network monitoring apparatus 100 includes a memory 110 and a processor 120.

The network monitoring apparatus 100 receives the performance management data sample from the network system 130 and stores the performance management data sample in the memory 110. For example, the network monitoring apparatus 100 may include a communicator (not shown), and may receive the performance management data sample through the communicator and store the performance management data sample in the memory 110.

The memory 110 stores the performance management data sample. The memory 110 may store data and instructions necessary for the operation of the network monitoring apparatus 100. The memory 110 may be implemented as at least one of a volatile storage medium or a nonvolatile storage medium, or a combination thereof. The memory 110 may be implemented in various types of storage media. The memory 110 may include at least one type of storage medium among a flash memory type memory, a hard disk type memory, a multimedia card micro type memory, a card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and an optical disk. According to an embodiment of the disclosure, the memory 110 may correspond to a cloud storage space. For example, the network monitoring apparatus 100 and the memory 110 may be implemented through a cloud service.

The processor 120 controls the overall operation of the network monitoring apparatus 100. The processor 120 may be implemented in one or more processors. The processor 120 may perform a certain operation by executing an instruction or command stored in the memory 110.

The processor 120 performs an operation of the abnormality detection model 122. The abnormality detection model 122 may be implemented in a certain software block or hardware block. For example, the processor 120 may execute a computer program stored in the memory 110 to perform the operation of the abnormality detection model 122. According to another embodiment of the disclosure, the processor 120 includes a dedicated processor that performs an operation of the machine learning model, and may perform the operation of the abnormality detection model 122 by the dedicated processor. According to another embodiment of the disclosure, the processor 120 may use the abnormality detection model 122 operating in an external device such as a server. In this case, the processor 120 may transmit the performance management data sample to the abnormality detection model 122 of the external device and receive an output of the abnormality detection model 122 from the external device.

The abnormality detection model 122 is an artificial intelligence model that has been machine-trained in advance. The abnormality detection model 122 may include an auto-encoder 124. The auto-encoder 124 of the abnormality detection model 122 may correspond to an artificial neural network model or may correspond to a deep neural network model. The auto-encoder 124 generates an output value by reconstructing an input value. With respect to a normal input value, the auto-encoder 124 generates and outputs the same reconstructed output value as the input value. With respect to an abnormal input value, the output value reconstructed by the auto-encoder 124 has an error with respect to the input value.

Machine learning is an algorithm technology that classifies/learns the features of input data autonomously. Element technology is a technology that utilizes a machine learning algorithm such as deep learning and includes technical fields such as linguistic understanding, visual comprehension, reasoning/prediction, knowledge representation, and motion control. The machine learning model may have, for example, a deep neural network structure. The machine learning model may be trained by using training data based on one or more nodes and arithmetic rules between nodes. The structure of a node, a structure of a layer, and arithmetic rules between nodes may be variously determined according to embodiments of the disclosure. The machine learning model includes hardware resources such as one or more processors, memory, registers, summing processing units, or multiplication processing units, and operates hardware resources based on a parameter set applied to each hardware resource. To this end, the processor operating the machine learning model may perform a task of allocating hardware resources or resource management processing with respect to each operation of the machine learning model. The machine learning model may have, for example, a structure such as a recurrent neural network (RNN), a long short-term memory (LSTM), and an auto-encoder. The abnormality detection model 122 according to an embodiment of the disclosure is a machine learning model using an auto-encoder structure.

The auto-encoder 124 is trained based on the performance management data sample of the network system 130. The auto-encoder 124 corresponds to the machine learning model and is machine-trained in advance based on the performance management data sample. According to an embodiment of the disclosure, the trained auto-encoder 124 receives the performance management data sample and an abnormality probability value, and outputs a reconstructed performance management data sample and an abnormality score value.

The processor 120 obtains the reconstructed performance management data sample and the abnormality score value from the auto-encoder 124. Also, the processor 120 detects an abnormal sample based on the abnormality score value output from the auto-encoder 124. According to an embodiment of the disclosure, the processor 120 inputs a default value of an abnormality probability value to the auto-encoder 124. The abnormality probability value is a value indicating a probability that a data sample input to the auto-encoder 124, that is, the performance management data sample, is abnormal. According to an embodiment of the disclosure, the default value of the abnormality probability value is a value indicating that the probability that the performance management data sample is abnormal is "0". The auto-encoder 124 outputs 0 or a value equal to less than a reference value as the abnormality score value when the input performance management data sample is normal, and outputs a value exceeding the reference value as the abnormality score value when the input performance management data sample is abnormal. Accordingly, the processor 120 determines whether the input performance management data sample is normal or abnormal based on the abnormality score value. When the abnormality score value is less than or equal to the reference value, the processor 120 determines that the input performance management data sample is normal, and when the abnormality score value exceeds the reference value, determines that the input performance management data sample is abnormal.

Figure 2:
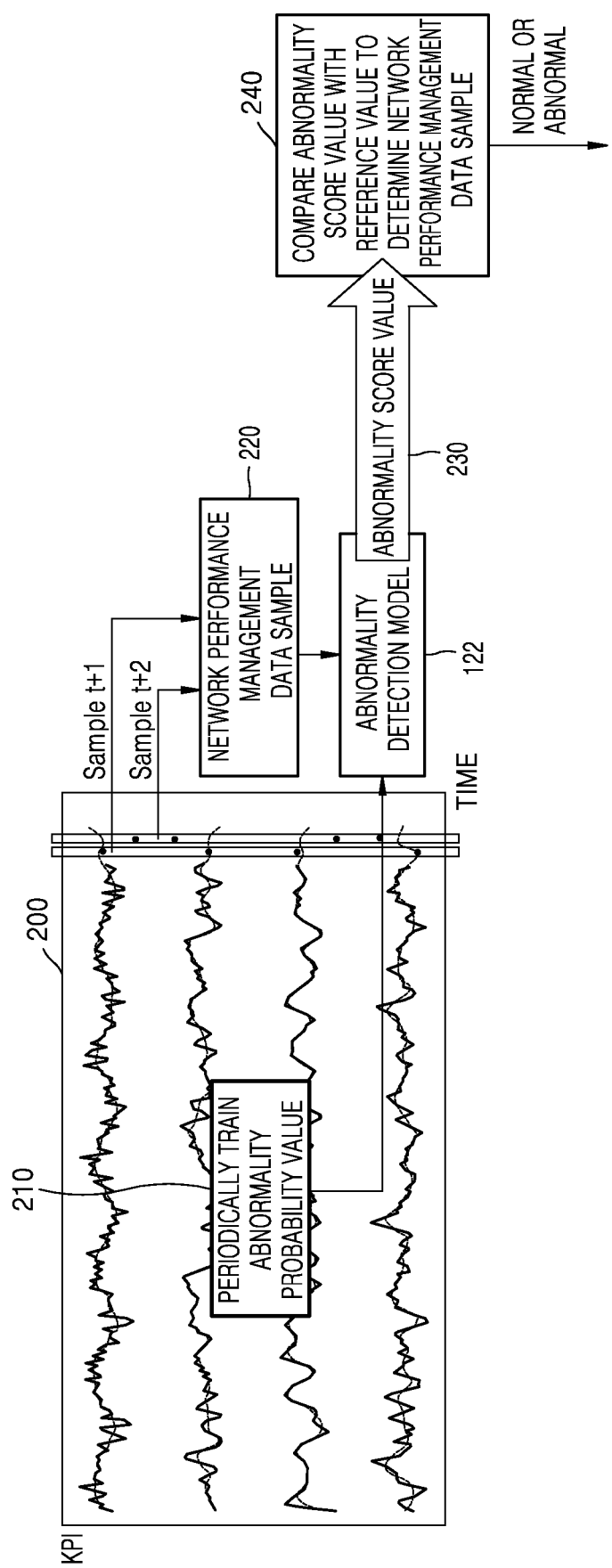
FIG. 2 is a diagram illustrating a process of obtaining an abnormality score value from network performance management data, according to an embodiment of the disclosure.

FIG. 2 is a diagram illustrating a process of obtaining an abnormality score value from network performance management data 200 according to an embodiment of the disclosure.

The network monitoring apparatus 100 collects the network performance management data 200 from the network system 130. The network performance management data 200 is periodically collected over time. For example, the network performance management data 200 collects a key performance indicator (KPI) value over time. The KPI value may include, for example, bandwidth, delay time, etc. In addition, the network monitoring apparatus 100 receives information about a network entity corresponding to each KPI value. For example, the network monitoring apparatus 100 receives an identification value of a base station, a server, etc. corresponding to the KPI value together with the KPI value.

The processor 120 of the network monitoring apparatus 100 stores the network performance management data 200 collected from the network system 130 in the memory 110, and uses the collected network performance management data 200 as training data to perform training on the abnormality detection model 122. Training on the abnormality detection model 122 may be performed at a design stage or may be periodically performed by the network monitoring apparatus 100.

According to an embodiment of the disclosure, the network monitoring apparatus 100 periodically trains an abnormality probability value using the collected network performance management data 200 (210). The network monitoring apparatus 100 obtains an abnormality score value by inputting a network performance management data sample to the abnormality detection model 122 and an abnormality probability value to the auto-encoder 124, and the abnormality probability input to the auto-encoder 124 is a preset default value. As described above, when obtaining the abnormality score value using the abnormality detection model 122 that has been trained, the network monitoring apparatus 100 inputs a default value as the abnormality probability value, but in a training process of the abnormality detection model 122, learns and updates the abnormality probability value and performs training of the abnormality detection model 122. Accordingly, the network monitoring apparatus 100 periodically learns the abnormality probability value by using the collected network performance management data sample, and updates the abnormality detection model 122.

The network monitoring apparatus 100 obtains an abnormality score value 230 from the network performance management data sample 220 using the abnormality detection model 122 that has been trained. The network monitoring apparatus 100 periodically receives the network performance management data sample 220 that is a monitoring target from the network system 130. For example, Sample t+1 and Sample t+2 corresponding to the network performance management data sample 220 may be input to the network monitoring apparatus 100 at an one minute interval. The abnormality detection model 122 receives the network performance management data sample 220 periodically, calculates and outputs the abnormality score value 230.

The processor 120 compares the abnormality score value 230 with a reference value to determine the input network performance management data sample 220 to be normal or abnormal (240). The abnormality score value 230 may be defined as a value, for example, between 0 and 1. According to an embodiment of the disclosure, the processor 120 determines the network performance management data sample 220 to be normal when the abnormality score value 230 is less than or equal to 0.5, and determines the network performance management data sample 220 to be abnormal when the abnormality score value 230 exceeds 0.5.

Figure 3:
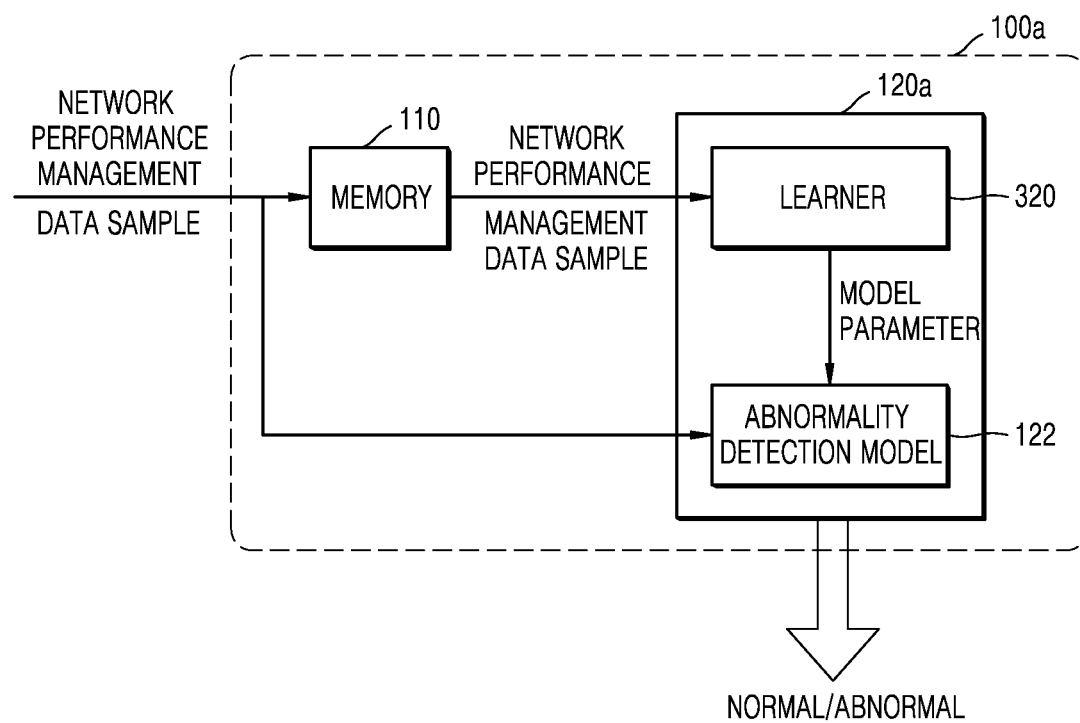
FIG. 3 is a diagram showing a structure of a network monitoring apparatus according to an embodiment of the disclosure.

FIG. 3 is a diagram showing a structure of a network monitoring apparatus 100a according to an embodiment of the disclosure.

According to an embodiment of the disclosure, the network monitoring apparatus 100a includes the memory 110 and a processor 120a. The processor 120a includes a learner 320 and the abnormality detection model 122.

The memory 110 stores network performance management data samples input from the network system 130. Network performance management data samples are input periodically over time. The network monitoring apparatus 100a may receive network performance management data through a communicator or a input interface. In addition, the network performance management data samples input to the network monitoring apparatus 100a may be input to the abnormality detection model 122 through the memory 110 or may be directly input to the abnormality detection model 122 from the communicator or the input interface.

The learner 320 learns model parameter values of the abnormality detection model 122 by using the collected network performance management data samples. The learner 320 may learn parameter values of the abnormality detection model 122 at every period during the operation of the network monitoring apparatus 100a.

According to an embodiment of the disclosure, the learner 320 may learn the parameter value of the abnormality detection model 122 when an event occurs in addition to the period. For example, the learner 320 may learn the parameter value of the abnormality detection model 122 when the abnormality detection model 122 detects an abnormal sample equal to or greater than a probability value, when information indicating that an event has occurred is input to the network system 130, etc.

According to an embodiment of the disclosure, the network performance management data samples input to the learner 320 includes all samples of a period. That is, in an embodiment of the disclosure, all samples in a period are used without separately defining a normal period in the network performance management data sample. When a machine learning model is trained based on a normal sample, the machine learning model needs to be trained by defining a normal period in the network performance data sample, and extracting only the network performance data sample corresponding to the normal period. However, an enormous amount of time and resources are consumed in a process of extracting the network performance data sample of the normal period. In order to extract the sample of the normal period, an intervention of an expert may be required, or another model may be required to extract a normal sample. According to an embodiment of the disclosure, samples of all periods are used to train the abnormality detection model 122 by inputting an abnormality probability value together with the network performance data sample to an auto-encoder of the abnormality detection model 122, without extracting the sample of the normal period separately. The abnormality probability value is a probability value at which an abnormal sample is found among input network performance data samples. According to an embodiment of the disclosure, in a learning stage, the abnormality probability value is controlled to train the auto-encoder to reconstruct the input network performance data sample and the abnormality probability value normally, and in a using stage, the abnormality probability value is input as a default value, and then the abnormal sample is detected using the reconstructed abnormality probability value as the abnormality score value. At this time, the default value of the abnormality probability value input to the auto-encoder is a value indicating that the probability that the input network performance data sample is abnormal is 0, and thus, when the network performance data sample input to the auto-encoder is the abnormal sample, the abnormality probability value is not reconstructed to its original value. Therefore, when the input network performance data sample is the abnormal sample, an abnormality score value, which is a reconstructed value of the abnormality probability value, is output as a value different from the default value. Eventually, with respect to the abnormal sample, the abnormality score value is output as the value different from the default value, and thus the abnormal sample may be detected using the abnormality score value.

The learner 320 according to an embodiment of the disclosure performs unsupervised learning. According to an embodiment of the disclosure, when training the abnormality detection model 122, it is not necessary to assign a normal or abnormal label to a network performance management data sample used as training data. The learner 320 learns the abnormality detection model 122 by using all network performance management data samples of which normal period is not separately defined as the training data. Because the auto-encoder of the abnormality detection model 122 according to an embodiment of the disclosure receives the abnormality probability value as an input, it is possible to learn the auto-encoder to reconstruct the normal sample without labeling the network performance management data sample used as the training data. Accordingly, the learner 320 may perform unsupervised learning to train the abnormality detection model 122 from the network performance management data sample.

The learner 320 generates the model parameter value of the abnormality detection model 122 according to results of learning, and updates the abnormality detection model 122. The model parameter may include a parameter such as layer definition, node definition, and weights between nodes in the auto-encoder of the abnormality detection model 122.

The abnormality detection model 122 is updated based on the model parameter value defined by the learner 320. When learning is completed, the abnormality detection model 122 receives the network performance management data sample, generates and outputs the abnormality score value with respect to the input network performance management data sample. The abnormality detection model 122 includes the auto-encoder to reconstruct the input network performance management data sample, and generate the reconstructed network performance management data sample. However, according to an embodiment of the disclosure, only an abnormality score value is used to determine whether the network performance management data sample is normal or abnormal, and the reconstructed network performance management data sample is not used.

Figure 4:
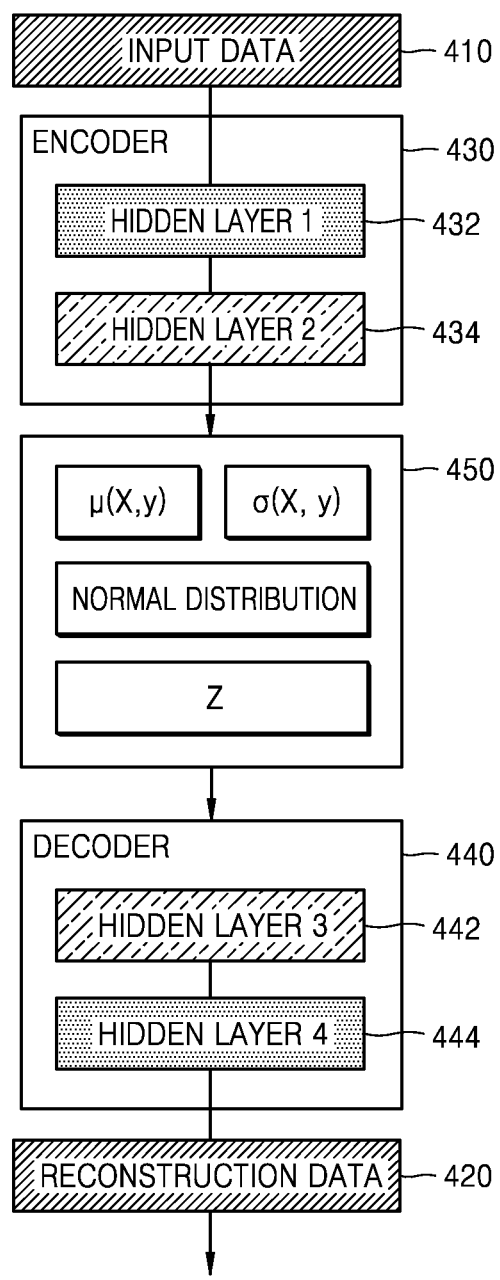
FIG. 4 is a diagram illustrating an auto-encoder included in an abnormality detection model, according to an embodiment of the disclosure.

FIG. 4 is a diagram illustrating the auto-encoder 124 included in an abnormality detection model according to an embodiment of the disclosure.

The auto-encoder 124 reconstructs input data 410 to generate reconstruction data 420. The auto-encoder 124 includes an encoder 430 and a decoder 440. The encoder 430 compresses data to generate a latent variable z, and the decoder 440 restores the input data 410 from the latent variable z to generate the reconstruction data 420. The auto-encoder 124 makes the input data 410 pass through latent sparse layers and reconstructs the input data 410.

The encoder 430 and the decoder 440 respectively include a plurality of hidden layers 432 and 434 and 442 and 444. The plurality of hidden layers 432 and 434 included in the encoder 430 are completely connected to each other, and each layer includes at least 128 neurons. The plurality of hidden layers 442 and 444 included in the decoder 440 are completely connected to each other, and each layer includes at least 128 neurons.

The auto-encoder 124 according to an embodiment of the disclosure corresponds to a variational auto-encoder (VAE). The VAE is a powerful deep generative model that generates new data using input data. The VAE is a powerful family of deep generative models that perform variational inference (VI) to learn a high-dimensional distribution with respect to a large dataset. The VI refers to approximation of a posterior distribution to an easy-to-handle probability distribution. The reason for approximation is that it is often difficult to calculate the posterior distribution which is almost impossible.

The encoder 430 of the VAE receives training data (hereinafter x) as input and outputs a parameter with respect to a probability distribution of a latent variable (hereinafter, z). For example, in the case of a Gaussian normal distribution, a parameter with respect to the probability distribution of the latent variable z are $\mu$ and $\sigma^2$. The decoder 440 receives a vector sampled from a probability distribution p(z) with respect to the latent variable z, that is, the latent variable z, and restores the original data using the received vector.

The VAE solves two problems through optimization. The first problem is to find a distribution of latent variables that well describe given data. To this end, the encoder 430 finds the distribution of latent variables from the input data 410. The second problem is to restore well the reconstruction data 420 such as the input data 410 from latent variables, which is a function of the decoder 440.

When data is given, the encoder 430 finds an ideal probability distribution p(z|x) that may sample the latent variable z that may be well restored to the original data by the decoder 440. However, we do not know which is the ideal probability distribution p(z|x). The VAE uses the VI to solve this problem.

The VI assumes an easy-to-handle distribution (approximation class, typically the Gaussian distribution) to estimate the ideal probability distribution that we do not know, and changes parameters of the probability distribution to approximate the ideal probability distribution and use the approximated probability distribution instead. According to an example, it is assumed that a marginal distribution of the latent variable z is a normal distribution with a mean of 0 and a variance of 1.

The auto-encoder 124 may include a separate coding layer 450 for the VI. The coding layer 450 generates the latent variable z by using a parameter with respect to the distribution of the input data 410 output from the encoder 430. For example, the encoder 430 generates an average value μ(X, y) and a standard deviation value σ(X, y) from the input data 410, and generates the latent variable z corresponding to the input data 410 by assuming a normal distribution corresponding to the average value μ(X, y) and the standard deviation value σ(X, y). The coding layer 450 outputs the latent variable z to the decoder 440.

The decoder 440 receives the extracted latent variable z, reconstructs input data from the latent variable z, and generates the reconstruction data 420.

The auto-encoder 124 successfully reconstructs the normal sample, but generates samples other than the normal sample having an output value with a reconstruction error. Therefore, the abnormal sample has a large reconstruction error value between the input data 410 and the reconstruction data 420. In embodiments of the disclosure, an abnormal sample is detected using an abnormal score value instead of using a reconstruction error value that is a difference value between the input data 410 and the reconstruction data 420.

Figure 5:
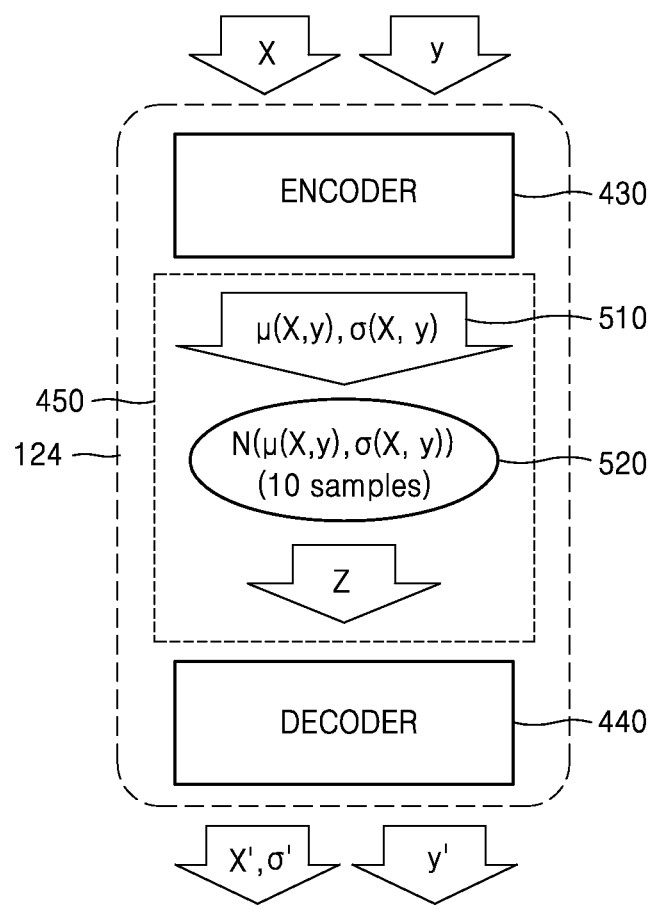
FIG. 5 is a diagram illustrating a process of obtaining an abnormality score value using an auto-encoder, according to an embodiment of the disclosure.

FIG. 5 is a diagram illustrating a process of obtaining an abnormality score value using the auto-encoder 124 according to an embodiment of the disclosure.

The abnormality detection model 122 includes the machine-trained auto-encoder 124, inputs a network performance data sample X and an abnormality probability value y to the auto-encoder 124, and obtains a reconstructed network performance data sample X', an estimated standard deviation value σ', and an abnormality score value y'. The input abnormality probability value y has a zero value meaning that the input network performance data sample X is labeled as normal, instead of being sampled from a Bernoulli distribution.

The encoder 430 generates the average value μ(X, y) and the standard deviation value σ(X, y) from the input network performance data sample X (510), and generates the latent variable z corresponding to the input data 410 by assuming a normal distribution corresponding to the average value μ(X, y) and the standard deviation value σ(X, y) (520). The coding layer 450 outputs the latent variable z to the decoder 440.

The decoder 440 reconstructs the network performance data sample X and the abnormality probability value y from the latent variable z and generates and outputs the reconstructed network performance data sample X', the estimated standard deviation value a', and the abnormality score value y'.

The auto-encoder 124 outputs the reconstructed network performance data sample X' and the abnormality score value y', but the processor 120 uses only the abnormality score value y' and does not use the reconstructed network performance data sample X' in the process of detecting an abnormal sample.

Figure 6:
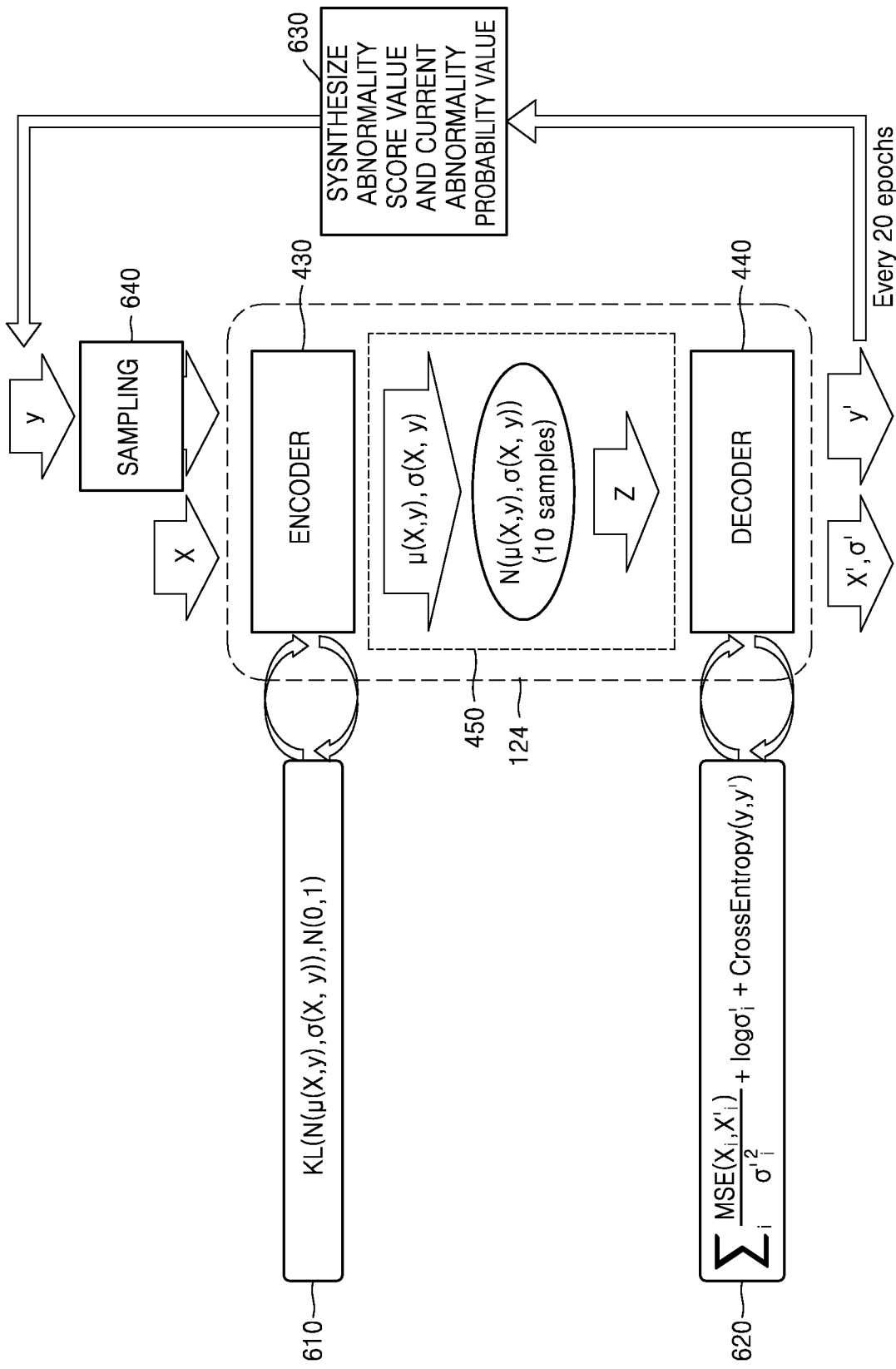
FIG. 6 is a diagram illustrating a machine learning process of an auto-encoder, according to an embodiment of the disclosure.

FIG. 6 is a diagram illustrating a machine learning process of the auto-encoder 124 according to an embodiment of the disclosure.

According to an embodiment of the disclosure, the learner 320 (refer to FIG. 3) trains the auto-encoder 124 using a set of network performance data samples X. The learner 320 trains the auto-encoder 124 by unsupervised learning without labeling the network performance data sample X.

The learner 320 first inputs the network performance data sample X and the initial abnormality probability value y to the auto-encoder 124. A process of obtaining the initial abnormality probability value y will be described later with reference to FIG. 7. According to an embodiment of the disclosure, the learner 320 may perform training in units of a sample set including a number of network performance data samples X. For example, the learner 320 performs training in units of a sample set including 10 network performance data samples X.

The encoder 430 infers the mean and standard deviation of the sample set, calculates the latent variable z, and outputs the latent variable z to the decoder 440. The decoder 440 generates the reconstructed network performance data sample X' and the abnormality score value y' from the latent variable z.

The learner 320 synthesizes the output abnormality score value y' and a current abnormality probability value (630). The synthesis of the abnormality score value y' and the abnormality probability value y may be performed using various functions. The learner 320 samples and updates the abnormality probability value y by using the synthesized abnormality probability value y (640). For example, the learner 320 updates the abnormality probability value y on the assumption that the network performance data sample X follows the Bernoulli distribution using the synthesized abnormality probability value y.

The learner 320 updates the abnormality score value y and a parameter value of the auto-encoder 124 at a period. For example, the learner 320 may update the abnormality score value y and the parameter value of the auto-encoder 124 every twenty time periods.

The learner 320 updates the encoder 430 so that a loss value 610 of the encoder 430 is minimized. The loss value 610 of the encoder 430 may be expressed in a function, for example, KL(N(μ(X, y), σ(X, y)), N(0, 1)). The learner 320 may train the encoder 430 to minimize Kullback-Leibler (KL) divergence. The KL divergence with respect to probability distributions P and Q is defined as follows. The learner 320 updates the parameter value of the encoder 430 so that a loss value decreases for each passing time period.

$$D_{KL}(P\|Q) = \sum_i P(i) \log \frac{P(i)}{Q(i)} \qquad \text{[Equation 1]}$$

The learner 320 updates the decoder 440 so that a loss value 620 of the decoder 440 is minimized. The loss value 620 of the decoder 440 may be defined as, for example, in Equation 2.

$$\Sigma_i \frac{MSE(X_i, X'_i)}{\sigma'^2_i} + \log \sigma'_i + CrossEntropy(y, y') \qquad \text{[Equation 2]}$$

Here, MSE denotes a mean squared error. The MSE loss function expresses an error of a correct answer as a number. The closer to the wrong answer, the larger the value is, and the closer to the correct answer, the smaller value is. The MSE may be expressed as the mean of a sum of squared values of a difference between each sample value and an average value.

CrossEntropy(y, y') may be defined as a cross entropy H(P,Q) function of Equation 3. The cross entropy function also represents the error of the correct answer as a number, and is a loss function that yields a larger value closer to the incorrect answer and a smaller value closer to the correct answer.

$$H(P, Q) = -\sum_{x} P(x)\log Q(x) \qquad \text{[Equation 3]}$$

The learner 320 updates the parameter value of the decoder 440 so that the loss value of Equation 2 is minimized as described above to train the decoder 440.

The learner 320 updates the abnormality score value, the encoder 430, and the decoder 440 after an amount of time periods have passed, and repeats machine-learning on the auto-encoder 124 until each parameter value converges to a value. The learner 320 may perform learning on the auto-encoder 124 after each period even while using the auto-encoder 124.

Figure 7:
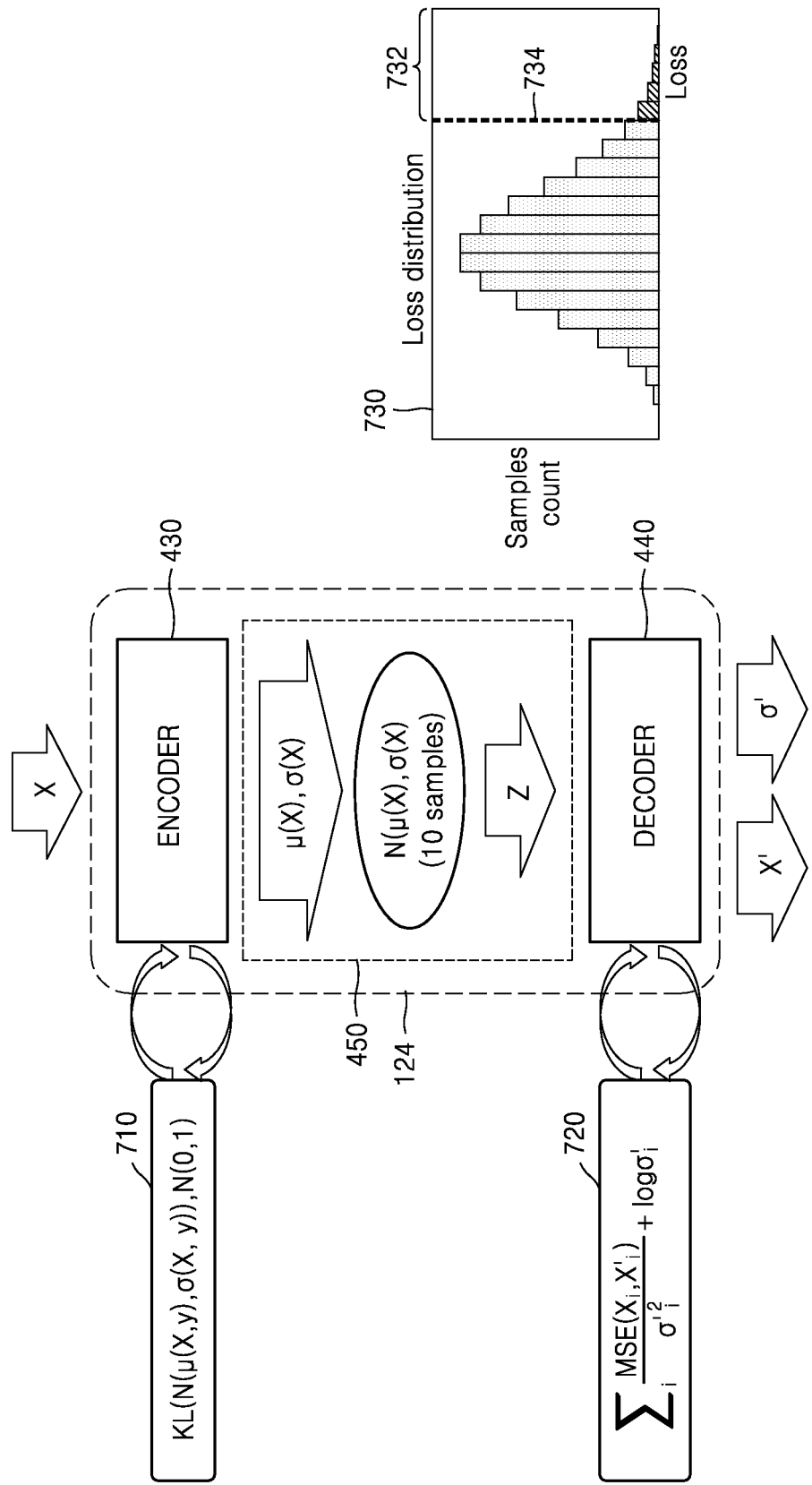
FIG. 7 is a diagram illustrating a process of calculating an initial abnormality probability value, according to an embodiment of the disclosure.

FIG. 7 is a diagram illustrating a process of calculating an initial abnormality probability value according to an embodiment of the disclosure.

According to an embodiment of the disclosure, the learner 320 inputs a number of network performance data samples X to reconstruct the network performance data samples X so as to calculate the initial abnormality probability value. The learner 320 obtains the reconstructed network performance data sample X' and the inferred standard deviation value σ' from the auto-encoder 124. The learner 320 uses the inferred standard deviation value σ' obtained from a number of network performance data samples X as the initial abnormality probability value. For example, the learner 320 obtains the initial abnormality probability value in a first time period, and starts learning on network parameter values of the encoder 430 and the decoder 440 of the auto-encoder 124 after a second time period.

According to an embodiment of the disclosure, the learner 320 calculates a ratio of samples exceeding a reference value within a normal distribution having the inferred standard deviation value σ' using the inferred standard deviation value σ', and cites a ratio value of samples exceeding the reference value as the initial abnormality probability value. That is, according to an embodiment of the disclosure, when determining the initial abnormality probability value, the learner 320 performs a process of calculating the ratio of samples exceeding the reference value without using the standard deviation value itself, and calculates the abnormality probability value. The network performance data sample may determine whether the sample is normal or abnormal by a loss function. For example, the network performance data sample may have a loss distribution 730 shown on the right side of FIG. 7. In this case, samples having a loss value equal to or greater than a reference value 734 may be determined as abnormal samples. The learner 320 calculates a ratio of samples 732 in which the loss value exceeds the reference value 734 using the inferred standard deviation value σ', and calculates the ratio of the samples 732 in which the loss value exceeds the reference value 734 using the calculated standard deviation value σ'.

The learner 320 uses Equations 4 710 and 5 720 to update the encoder 430 and the decoder 440 as results of learning with respect to the first time period.

$$KL(N(\mu(X, y), \sigma(X, y)), N(0, 1)) \qquad \text{[Equation 4]}$$

$$\sum_i \frac{MSE(X_i, X'_i)}{\sigma'^2_i} + \log \sigma'_i \qquad \text{[Equation 5]}$$

In the first time period, because there is no abnormality probability value y input to the encoder 430, the learner 320 defines the loss function only using an MSE value of input/output samples and the calculated standard deviation value as shown in FIG. 5, excluding the cross entropy function from the loss function of the decoder 440. The learner 320 modifies and updates the parameter values of the encoder 430 and the decoder 440 using results of learning with respect to the first time period using Equations 4 710 and 5 720.

Figure 8:
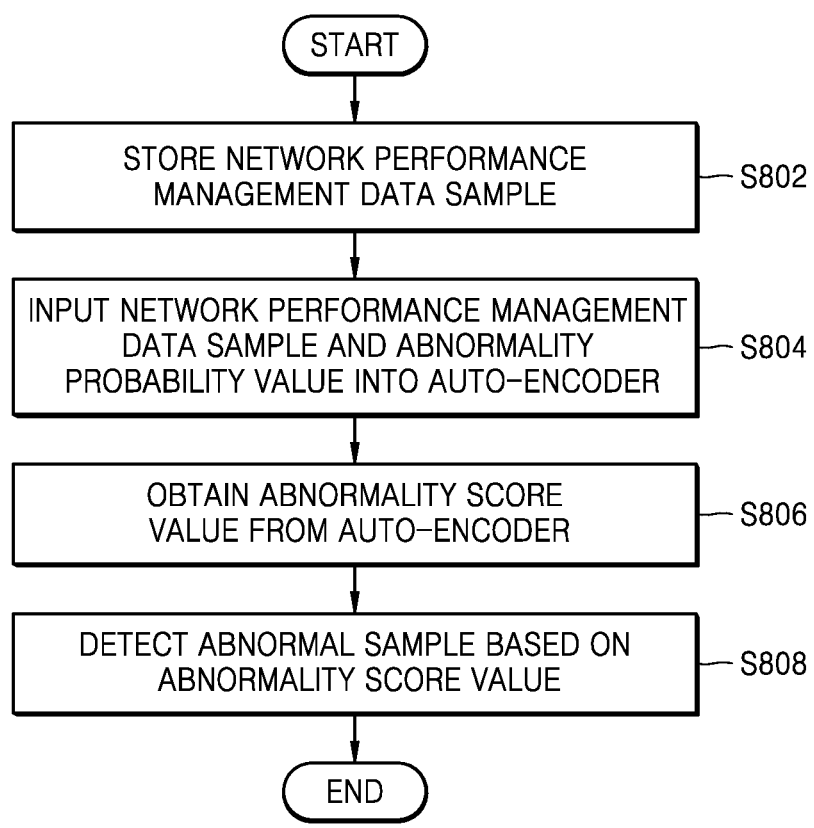
FIG. 8 is a flowchart illustrating a control method of a network monitoring apparatus, according to an embodiment of the disclosure.

FIG. 8 is a flowchart illustrating a control method of a network monitoring apparatus according to an embodiment of the disclosure.

Operations of the control method of the network monitoring apparatus according to embodiments of the disclosure may be performed by various types of electronic devices including a memory and a processor, and using a machine learning model. An embodiment of the disclosure in which the network monitoring apparatus 100 according to embodiments of the disclosure performs the control method of the network monitoring apparatus 100 will be described. Therefore, the embodiments described with respect to the network monitoring apparatus 100 may be applicable to the embodiments of the control method of the network monitoring apparatus 100, and on the contrary, the embodiments described with respect to the control method of the network monitoring apparatus 100 may be applicable to the embodiments with respect to the network monitoring apparatus 100. The control method of the network monitoring apparatus 100 according to the embodiments of the disclosure is not limited to being performed by the network monitoring apparatus 100 disclosed in the disclosure, and may be performed by various types of electronic devices.

In addition, embodiments of the disclosure described with reference to FIGS. 1 to 7 may be applied to the control method of the network monitoring apparatus 100. In addition, operations of the network monitoring apparatus 100 described with reference to FIGS. 1 to 7 may be added as operations of the control method of the network monitoring apparatus 100.

First, the network monitoring apparatus 100 receives a network performance management data sample from the network system 130 and stores the network performance management data sample in a memory (S802). The network monitoring apparatus 100 may receive and store the network performance management data sample received from the network system 130 through a communicator or an input interface.

Next, the network monitoring apparatus 100 inputs the network performance management data sample and an abnormality probability value to the auto-encoder 124 (S804). The auto-encoder 124 is a machine-trained model in advance using the network performance management data sample as training data. The network monitoring apparatus 100 inputs an abnormality probability value having a default value to the auto-encoder 124. The default value of the abnormality probability value is a value indicating that an abnormality probability is 0.

Next, the network monitoring apparatus 100 obtains an abnormality score value from the auto-encoder 124 (S806).

The auto-encoder 124 reconstructs a performance management data sample and an abnormality score value. The auto-encoder 124 outputs the reconstructed network performance management data sample obtained by reconstructing the input network performance management data sample and the abnormality score value. The network monitoring apparatus 100 determines whether the sample is normal or abnormal by using the abnormality score value among the output values.

Next, the network monitoring apparatus 100 determines whether the input network performance management data sample is normal or abnormal, and detects the abnormal sample based on the abnormality score value (S808). The network monitoring apparatus 100 compares the abnormality score value with a reference value, and determines a sample of which abnormality score value exceeds the reference value as the abnormal sample. The network monitoring apparatus 100 outputs results of detection of the abnormal sample.

FIG. 9 is a diagram illustrating performance test results according to an embodiment of the disclosure.

Embodiments of the disclosure are tested with network performance tracking of PM data collected in an actual mobile communication system. A PM data set includes 67 features collected from 16 eNBs during a month. The data collected from the 16 eNBs are labeled "normal" or "abnormal" by a domain expert. The label is not used in the proposed solution, but is used to evaluate the accuracy of anomaly detection output by the present solution.

The heteroskedastic de-noising VAE is used to detect an unsupervised abnormality. An encoder and a decoder are fully connected networks and include two hidden layers each having 128 neurons. The optimal results are obtained when a dimension of a latent space is 2.

Each training, evaluation, and testing process is repeated 10 times. This method is standard when used in different supervised techniques for comparison. Ground truth is obtained from data labels. The evaluation results are shown in a table in FIG. 9.

As a result of evaluation, precision is measured as 0.9141, TPR (True positive rate) is measured as 0.8952, FPR (False positive rate) is measured as 0.0014, F1 0.9045, TP (True Positive) is measured as 1682, TN (True Negative) is measured as 110159, FP (False Positive) is measured as 158, and FN (False Negative) is measured as 197. TP denotes the number of abnormalities correctly detected as abnormalities, TN denotes the number of normalities correctly detected as normalities, FP denotes the number of normalities incorrectly detected as abnormalities, and FN denotes the number of abnormalities incorrectly detected as normalities. Here, precision is defined as Precision=TP/(TP+FP). TPR is defined as TPR=FP/(FP+TN). F1 denotes a special score indicating when beta is 1, and is defined as $F_1=2*Precision*TPR/(Precision+TPR)$. As shown in FIG. 9, the embodiments of the disclosure exhibit a high accuracy more than 90%. Embodiments of the disclosure exhibit a high accuracy through unsupervised learning without labeling, thereby significantly reducing the learning cost of an abnormality detection model and facilitating periodic model update.

In addition, the embodiments of the disclosure use unsupervised learning, which does not need normal or abnormal labeling for each sample in advance, and does not require classification of abnormal types, thereby detecting even undefined abnormal types. That is, the abnormality detection model according to the embodiments of the disclosure learns normal samples and outputs a high abnormality score value from non-normal samples, thereby detecting an abnormal sample that has not been trained or defined in advance.

In addition, one or more embodiments of the disclosure may be implemented as a computer program and as a device readable storage medium storing the computer program.

The device readable storage medium may be provided in the form of a non-transitory storage medium. Here, the term "non-transitory storage medium" simply denotes that the storage medium is a tangible device, and does not include a signal (e.g. an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, the method according to one or more embodiments of the disclosure herein may be included in a computer program product. The computer program product may be traded between a seller and a buyer as a product. The computer program product may be distributed in the form of a device-readable storage medium (e.g., compact disc read only memory (CD-ROM)), or may be distributed (e.g., downloaded or uploaded) directly and online through an application store (e.g., Play Store™) or between two user devices (e.g., smartphones). In the case of online distribution, at least some computer program products (e.g., a downloadable app) be temporarily stored or created temporarily in a device-readable storage medium such as a server of a manufacturer, a server of an application store, or memory of a relay server.

The embodiments of the disclosure are described as above with reference to accompanying drawings. It will be understood by one of ordinary skill in the art that the disclosure may be implemented in different forms from those of disclosed embodiments of the disclosure without changing technical features or essential characteristics of the disclosure. The embodiments of the disclosure are examples and should not be construed as limiting.

What is claimed is:

1. A network monitoring apparatus comprising:
a memory configured to store a performance management data sample of a network; and
at least one processor configured to:
input both of the performance management data sample and an abnormality probability value to an auto-encoder of an abnormality detection model that is trained based on performance management data of the network, wherein the abnormality probability value is a default value for the abnormality detection model and the abnormality probability value indicates a probability that the performance management data sample is abnormal,
obtain, from the auto-encoder of the abnormality detection model, a reconstructed performance management data sample and an abnormality score value, and
detect an abnormal sample based on the abnormality score value,
wherein the auto-encoder is configured to receive the performance management data sample and the abnormality probability value, and output the reconstructed performance management data sample and the abnormality score value,
wherein the at least one processor is further configured to:
perform one loop of training of the auto-encoder by using auto-encoder training data comprising an initial value of the abnormality probability value and a first number of performance management samples to train the abnormality detection model, and in a training process, train the abnormality probability value by using the first number of performance management samples, and update the abnormality probability value output from the auto-encoder after an amount of time periods have passed.

2. The network monitoring apparatus of claim 1, wherein the at least one processor is further configured to determine the performance management data sample as an abnormal sample based on the abnormality score value exceeding a reference value.

3. The network monitoring apparatus of claim 1, wherein the at least one processor is further configured to train the abnormality detection model by updating the auto-encoder to minimize a loss function of the auto-encoder after an amount of time periods have passed.

4. The network monitoring apparatus of claim 1, wherein:
the auto-encoder comprises an encoder and a decoder,
the encoder is configured to generate a latent variable from the performance management data sample and the abnormality probability value, and
the decoder is configured to generate the reconstructed performance management data sample and the abnormality score value from the latent variable.

5. The network monitoring apparatus of claim 4, wherein the at least one processor is further configured to train the encoder to minimize a Kullback-Leibler (KL) divergence loss value.

6. The network monitoring apparatus of claim 4, wherein the at least one processor is further configured to train the decoder to minimize a loss value determined by a difference between the performance management data sample and the reconstructed performance management data sample, a standard deviation of the reconstructed performance management data sample, and a cross entropy value between the abnormality probability value and the abnormality score value.

7. The network monitoring apparatus of claim 1, wherein the at least one processor is further configured to:
input initial value training data comprising normal and abnormal periods of the performance management data sample to the auto-encoder,
obtain the reconstructed performance management data sample and an initial standard deviation value with respect to the reconstructed performance management data sample from the auto-encoder, and
determine an initial abnormality probability value based on the initial standard deviation value.

8. The network monitoring apparatus of claim 7, wherein the initial abnormality probability value indicates a ratio of reconstructed performance management data samples belonging to an abnormality range in a normal distribution of the reconstructed performance management data sample determined based on the initial standard deviation value.

9. The network monitoring apparatus of claim 4, wherein each of the encoder and the decoder comprises at least two hidden layers that are fully connected.

10. The network monitoring apparatus of claim 1, wherein the auto-encoder comprises a variational auto-encoder (VAE).

11. The network monitoring apparatus of claim 1, wherein the default value of the abnormality probability value is a value indicating that a probability of detecting an abnormal sample is 0.

12. A control method of a network monitoring apparatus, the control method comprising:

storing a performance management data sample of a network;

inputting both of the performance management data sample and an abnormality probability value to an auto-encoder of an abnormality detection model that is trained based on performance management data of the network, wherein the abnormality probability value is a default value for the abnormality detection model and the abnormality probability value indicates a probability that the performance management data sample is abnormal;

obtaining, from the auto-encoder of the abnormality detection model, a reconstructed performance management data sample and an abnormality score value;

detecting an abnormality sample based on the abnormality score value;

performing one loop of training of the auto-encoder by using auto-encoder training data comprising an initial value of the abnormality probability value and a first number of performance management samples to train the abnormality detection model; and in a training process, training the abnormality probability value by using the first number of performance management samples, and updating the abnormality probability value output from the auto-encoder after an amount of time periods have passed, wherein the auto-encoder is configured to receive the performance management data sample and the abnormality probability value and output the reconstructed performance management data sample and the abnormality score value.

13. The control method of claim 12, wherein the detecting of the abnormal sample comprises determining the performance management data sample as an abnormal sample based on the abnormality score value exceeding a reference value.

14. A non-transitory computer-readable storage medium having stored therein a computer program for executing a control method of a network monitoring apparatus, when executed by a processor, wherein the control method comprises:

storing a performance management data sample of a network;

inputting both of the performance management data sample and an abnormality probability value to an auto-encoder of an abnormality detection model that is trained based on performance management data of the network, wherein the abnormality probability value is a default value for the abnormality detection model and the abnormality probability value indicates a probability that the performance management data sample is abnormal;

obtaining, from the auto-encoder of the abnormality detection model, a reconstructed performance management data sample and an abnormality score value from the performance management data sample and the abnormality probability value;

detecting an abnormal sample based on the abnormality score value;

performing one loop of training of the auto-encoder by using auto-encoder training data comprising an initial value of the abnormality probability value and a first number of performance management samples to train the abnormality detection model; and in a training process, training the abnormality probability value by using the first number of performance management samples, and updating the abnormality probability value output from the auto-encoder after an amount of time periods have passed, wherein the auto-encoder is configured to receive the performance management data sample and the abnormality probability value, and output the reconstructed performance management data sample and the abnormality score value.

\* \* \* \* \*